United States Patent [19]

MacDonald

[11] 4,011,632

[45] Mar. 15, 1977

[54] CORNER PROTECTOR FOR STRAPPED STACKS

[75] Inventor: Paul M. MacDonald, Scituate, Mass.

[73] Assignee: PX Industries, Inc., Rockland, Mass.

[22] Filed: Aug. 20, 1975

[21] Appl. No.: 606,168

[52] U.S. Cl. .................................. 24/16 R; 16/10
[51] Int. Cl.² ........................................ B65D 63/00
[58] Field of Search .......... 24/16 R; 206/60; 16/10, 16/16

[56] References Cited

UNITED STATES PATENTS

| 749,834 | 1/1904 | Beisel | 24/16 R |
| 1,003,108 | 9/1911 | Hinrich | 24/16 |
| 3,745,606 | 7/1973 | Matthey | 16/16 |
| 3,875,617 | 4/1975 | Cline | 24/16 R |

Primary Examiner—Werner H. Schroeder
Assistant Examiner—Doris L. Troutman
Attorney, Agent, or Firm—Morse, Altman, Oates & Bello

[57] ABSTRACT

A protective corner shield for use with strap-bound stacks of cartons or the like is provided to prevent a highly tensioned strap from damaging the corners of the stack. The shield is formed with two flat legs substantially perpendicular to one another having parallel spaced ribs on their outer surfaces defining a shallow channel to receive and position the strap. One of the legs is formed on its inner face with a lip extending in spaced parallel relation to the other leg by a distance corresponding to the thickness of one of the stacked cartons. The lip when slipped between two cartons in the stack serves to hold the corner shield in position before, during and after the installation of the strap.

2 Claims, 5 Drawing Figures

CORNER PROTECTOR FOR STRAPPED STACKS

BACKGROUND OF THE INVENTION

1. Field of the Invention

This invention relates generally to protective corner shields for use with high-tensioned strapping bound about stacks of cartons or the like to prevent the strapping from biting in and damaging the bound goods at the corners.

2. Description of the Prior Art

In shipping many types of products, particularly shallow flat cartons, books, or the like, it is common practice to stack a number of cartons together and bind them by means of a metal strap, wire, or the like. The strap usually is pulled quite tight before locking with the result that very often the outer corners of the top and bottom cartons are damaged by the strap biting into the carton. The damaged cartons must then be discarded or discounted with an economic loss to the shipper. If the strap is too loose, the cartons tend to slip out of the stack.

While the corner shields comprised of simple L-shaped pieces have been employed heretofore to protect the cartons from the straps, these shields have not been entirely satisfactory since they tend to become displaced quite easily, particularly during the installation of the strapping. Since the stack of cartons is usually moved about while the strapping is being installed, simple L-shaped corners will not stay in place and the results tend to be irregular with some corners protected and others not. In some instances, the shields work loose during shipment so that the strap itself then becomes loose.

Accordingly, it is an object of the present invention to provide new and improved corner shields for use with strapped products bound with tensioned straps, wires or the like. A more particular object of this invention is to provide a protective shield of the foregoing type that will remain in position before, during and after the installation of the strapping.

SUMMARY OF THE INVENTION

This invention features protective corner shields for use with stacks of goods bound by means of tensioned straps, wires or the like, comprising a one-piece device, typically of molded plastic, having a pair of flat legs substantially perpendicularly to one another and adapted to be positioned over the corners of the stack to underly the strap which is wrapped about the stack to tensioned. The two legs are formed with an outer pair of spaced parallel ribs defining a shallow channel to receive and locate the metal strap applied about the stack. A thin lip is formed integral to the inner face of one of the legs and extends in spaced parallel relation to the other leg by a distance corresponding with the thickness of a carton so that the lip, when the shield is installed, will be clamped between a pair of cartons holding the shield in place while the strap is installed.

DETAILED DESCRIPTION OF THE PREFERRED EMBODIMENT

Figure 1:
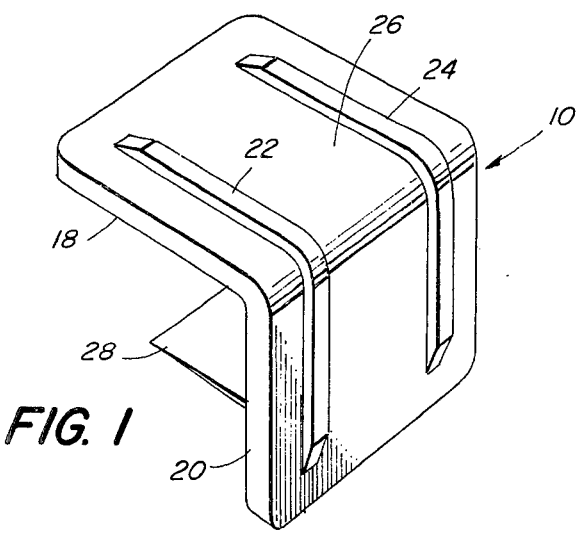
FIG. 1 is a view in perspective of a protective corner shield made according to the invention.
Figure 2:
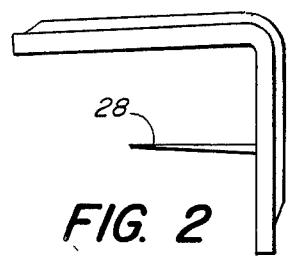
FIG. 2 is a view in side elevation of the shield.
Figure 3:
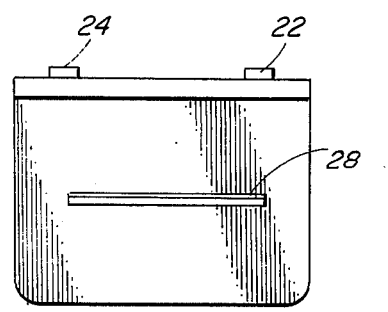
FIG. 3 is a view in rear elevation thereof.
Figure 4:
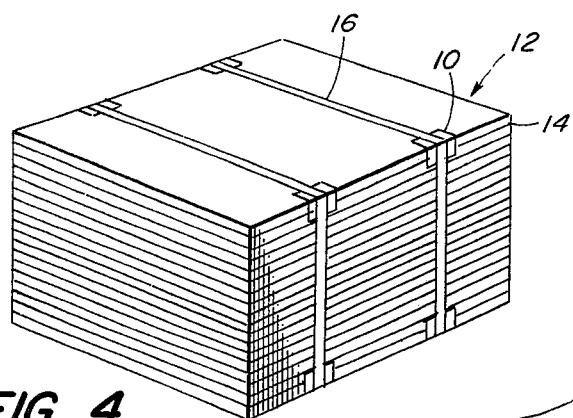
FIG. 4 is a perspective view showing a typical stack of bound cartons with the protective corner shields installed, and, FIG. 5 is an enlarged detail view of FIG. 4.
Figure 5:
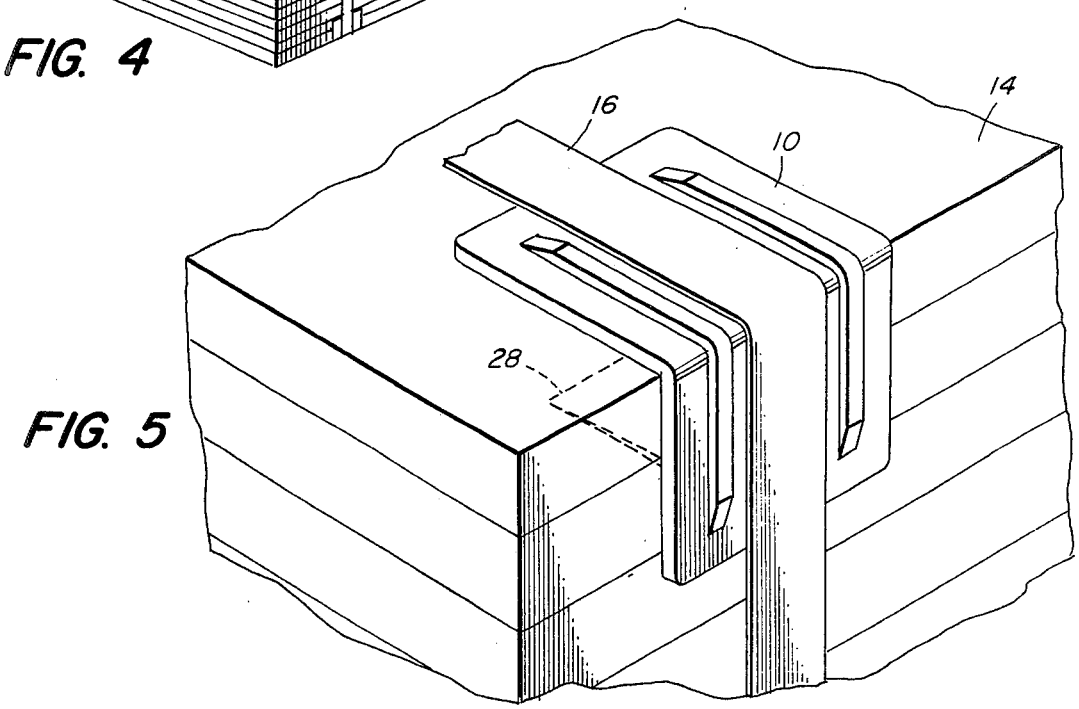

Referring now to the drawings, the reference character 10 generally indicates a corner shield for use on a stack 12 of relatively thin flat goods, such as cartons 14 or the like, bound together by means of a tensioned strap 16 typically a flexible, thin, steel band. In practice, the stack 12 of cartons, books, etc., 14 can be held firmly together by means of a pair of bands or straps 16 wrapped about the stack and secured by well-known strapping tools. In order to protect the corners of the stack from being damaged by the straps, a shield 10 is installed at each corner and positioned to underly the strap 16 in the manner best shown in FIG. 4. Thus, when the strap is tightened and locked, the strap will not bite into the corners of the outermost cartons but rather these will be protected by the shields which are molded of stiff but highly resilient plastic such as PVC or the like.

Each shield 10 preferably is of one-piece construction comprises of a pair of flat legs 18 and 20 slightly tapered towards their outer edges and the two legs are oriented preferably at an angle slightly less than a right angle, typically about 83°, to provide a slight cushioning effect when the band is tightened against the shield causing the legs to spread apart under the applied pressure to 90°. Typically, each leg may be on the order of 1½ inches long by 2½ inches wide although the dimensions are only by way of example and may be varied according to the size of the stacked products on which they are to be used.

Formed on the outer faces of the legs 18 and 20 is a pair of spaced parallel ribs 22 and 24 of perhaps ⅜ in width and perhaps 1/16 inch in height. The ribs terminate perhaps a ¼ inch from the outer end of each leg and define a shallow channel 26 of a width typically on the order of 1 inch to accommodate the strapping band 16 that is used to bind the stack. Again, the dimensions may be varied according to the width of the band being used. The channel 26 aids in holding the shield in place and, once the band is tightened, it is extremely difficult for the shield to be dislodged by virtue of the ribs engaging the edges of the strap under a tightened condition.

Formed perpendicularly to the inner face of the leg 20 is a lip 28 extending generally parallel to the leg 18 although in a slightly converging direction by virtue of the angle between the legs 18 and 20. The lip 28 preferably is quite thin and extends outwardly a distance of perhaps an inch with a width on the order of 1½. Again, these dimensions may be varied according to the size of the shield. The lip 28 is spaced from the leg 18 by a distance corresponding to the thickness of a carton 14 and, in the illustrated embodiment, a distance of ¾ is employed. Obviously, the distance may be varied according to the size of the shield. The lip 28 is spaced from the leg 18 by a distance corresponding to the thickness of a carton 14 and, in the illustrated embodiment, a distance of ¾ inch is employed. Obviously, the distance may be varied according to the thickness of the carton, book or other product to be bound by the strapping or the spacing may be related to several thicknesses of the product such as magazines, for example, so that several such products will fit between the leg 18 and the lip 28 when the shield is installed.

In any event, the shield is first installed by placing it on the outer corners of the stack 10, top and bottom, with the lip 28 inserted between the two topmost and lowermost cartons in the stack. With the lip extending in between the two outermost cartons the shields will be clamped in place not only by the weight of the carton against the lip but also be virtue of the clamping action between the leg 18 and the lip 28 which are at a slight angle with one another. In this manner, the shield will remain in place while the stack is being wrapped and secured by the bands 16 and will not dislodge despite manipulation of the band and movement of the stack during the banding operation.

The shields may be used with metal bands, wires or cord as desired. The shields are sufficiently strong to prevent the bands 16 from biting into the corners of the stack and the cartons therein despite a high level of tension applied to banding. Thus, the stack may be firmly bound for shipment without damage to the stack which might otherwise be encountered. The shields are of an inexpensive plastic and may be discarded when the stack is opened or may be recovered for re-use.

Having thus described the invention what I claim and desire to obtain by Letters Patent of the U.S. is:

1. A shield for protecting the corners of a stack of flat cartons and the like bound by strapping or the like, comprising
   a. a pair of integral generally flat straight legs of substantially corresponding length, width and thickness oriented at an approximately 90° angle with respect to one another and adapted to be positioned over the corner of said stack, said legs defining a full supporting transverse surface at least at the corner formed by said legs, and
   b. a single thin straight tapered lip integral with one of said legs and extending perpendicularly from the inner face thereof in generally parallel spaced relation to said other leg for insertion between adjacent cartons in said stack,
   c. the inner face of said other leg being smooth and flat,
   d. the outer faces of said legs being formed with a shallow channel extending in the direction of said legs.

2. A shield according to claim 1 wherein said lip is shorter than said legs.

* * * * *